United States Patent [19]

Andrews

[11] 4,111,677

[45] Sep. 5, 1978

[54] APPARATUS FOR DRAWING GLASS TUBING

[75] Inventor: James D. Andrews, Birmingham, Mich.

[73] Assignee: TRW Inc., Cleveland, Ohio

[21] Appl. No.: 543,754

[22] Filed: Jan. 24, 1975

[51] Int. Cl.² .................... C03B 23/00; C03B 21/00; C03B 23/04

[52] U.S. Cl. ........................ 65/271; 65/278; 65/280; 65/276; 65/292; 65/297; 65/109

[58] Field of Search .............. 65/109, 271, 296, 292, 65/280, 283, 278, 276

[56] References Cited

U.S. PATENT DOCUMENTS

| | | | |
|---|---|---|---|
| 2,267,108 | 12/1941 | Juvinall et al. | 65/280 X |
| 2,282,993 | 5/1942 | Dichter | 65/280 X |
| 3,485,613 | 12/1969 | Herczog et al. | 65/280 X |
| 3,852,054 | 12/1974 | Dichter | 65/109 |

*Primary Examiner*—S. Leon Bashore
*Assistant Examiner*—Frank W. Miga

[57] ABSTRACT

Method and apparatus for providing a glass tube with a uniform nozzle portion, i.e., one which has a true centerline. The method involves suspending the tube on vertically space suspension points therealong, with the lower of the suspension points being arranged to apply a dead weight to the tube. The tube is rotated at the upper of the suspension points as it is heated above its vertical center to a temperature at which it becomes slightly plastic, but below the temperature at which the dead weight could significantly stretch the tube. This heating to the point of plasticity allows the dead weight to straighten out any axial deviations in the tube. Following the straightening, the tube is heated centrally to a higher drawing temperature sufficient to allow the dead weight to stretch the tube to a predetermined length and thereby provide a uniform necked down portion centrally of the tube. The necked down portion can then be severed at its midpoint to provide two glass electrode tubes.

6 Claims, 5 Drawing Figures

U.S. Patent  Sept. 5, 1978  4,111,677
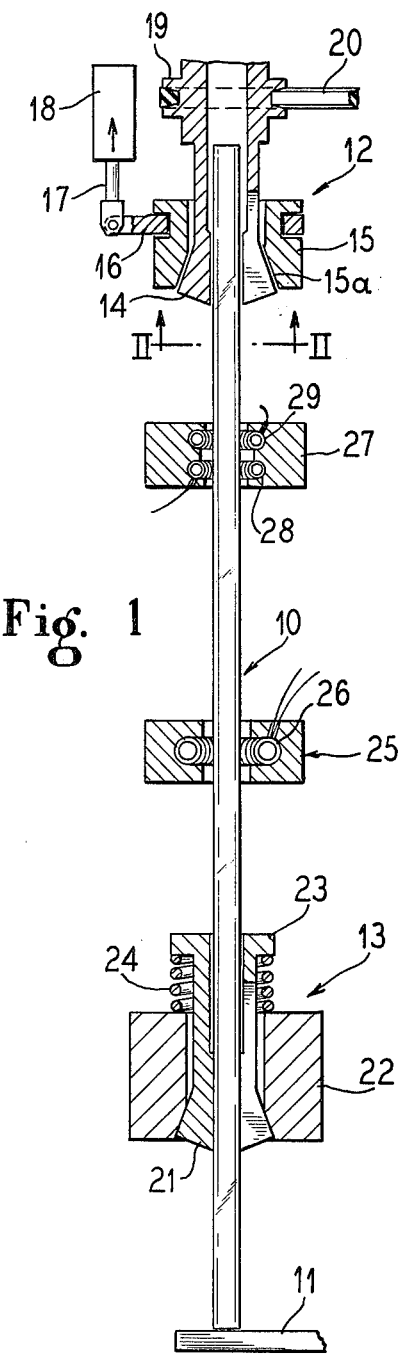
Fig. 1
Fig. 2
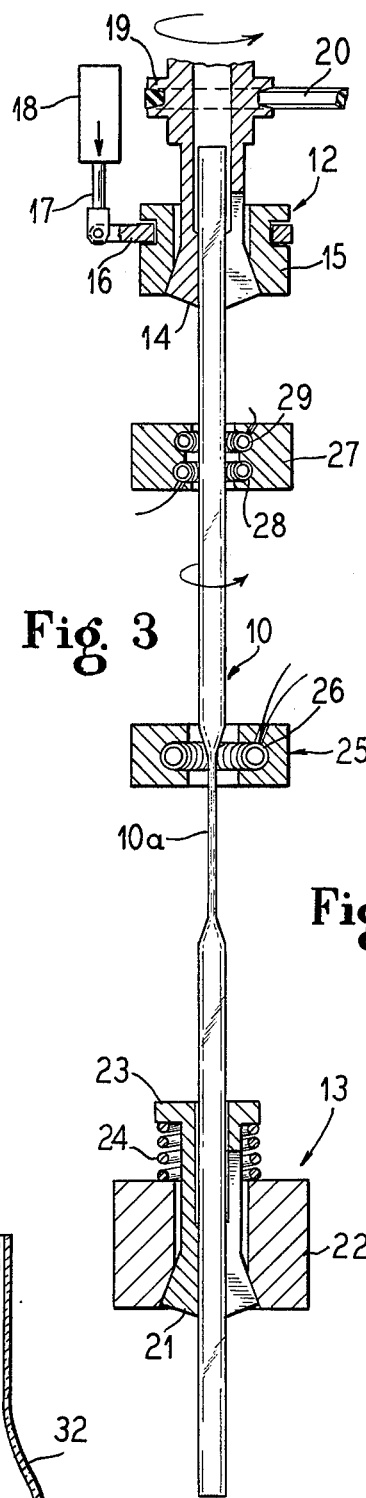
Fig. 3
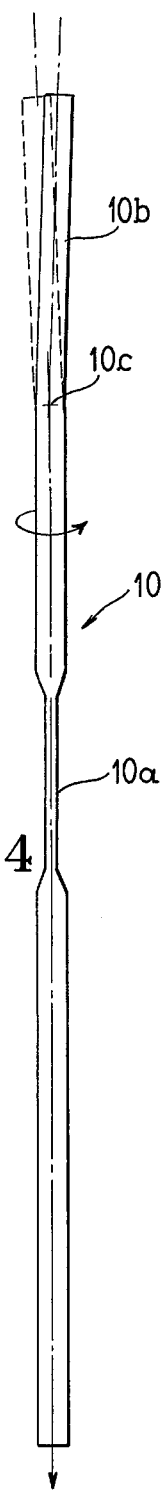
Fig. 4
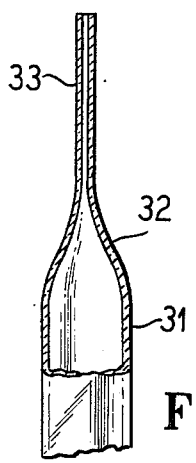
Fig. 5

APPARATUS FOR DRAWING GLASS TUBING

BACKGROUND OF THE INVENTION

1. Field of the Invention

This invention is in the field of forming uniform diameter nozzles in a tube of glass or other thermoplastic material utilizing stretching of the tube by means of a weight applied thereto as a portion of the tube is at a drawing temperature.

2. Description of the Prior Art

In two previous patents issued to me solely or jointly, U.S. Pat. Nos. 3,403,084 and 3,489,544, there are disclosed electrochemical machining processes using glass nozzles and also apparatus for making such nozzles. The known electrochemical machining processes involve penetration of a nozzle-type tool into a workpiece being machined as cavity sinking progresses, requiring not only very accurately sized internal nozzle tip diameters, but also very thin nozzle walls in order that the cavity formed in the workpiece be close to the diameter of the electrolyte stream forming the cavity and still be large enough to accept the tip end of the nozzle.

In U.S. Pat. No. 3,556,758 in which the present applicant is a co-inventor, there is described a method for drawing a hollow glass member which involves rotating the hollow glass member while applying a tube stretching force which is less than that which will produce plastic deformation at room temperature, applying to a selected portion of the tube heat at a heating rate sufficient to allow the tube stretching force to elongate the tube to a predetermined axial tube length, and thereafter heating the portion of the tube at a slower heating rate to control further elongation of the portion of the tube until the final axial tube length is achieved.

In any tube drawing process which involves suspending a weight at the bottom tube end and rotating the tube while it is being heated, it frequently occurs that the drawn tube does not have a true centerline, i.e., it may have a small bend which must be removed if the tube is to be used for precision purposes such as an electrode in an electrochemical machining process. The non-uniformity in the tube can be caused by several factors. For one, glass tubes as supplied frequently have slight bends in them and rotating such tubes while heating them accentuates the problem. Secondly, the gripping means which are employed in glass tube drawing machines are not always perfect in that they may cause rotation of the tube along other than the true vertical centerline in which case the drawn tube will again not have a uniform centerline.

With the use of tube drawing machines of the prior art, it is usually necessary to have personnel assigned to the job of doing nothing but straightening the tubes after they have been drawn. This procedure is costly and time consuming and adds a significant amount of cost to the final product.

The need still remains, therefore, for a tube drawing method and apparatus which will overcome the difficulties of the prior art and provide accurate drawing of a tube to a true centerline in all cases. The satisfaction of that need is the principal object of the present invention.

SUMMARY OF THE INVENTION

The present invention provides a method and apparatus for forming a glass tube with a uniform nozzle portion having a true centerline. The apparatus of the present invention includes support means for releasably supporting a tube above its vertical center, and weighting means for releasably applying a dead weight to the tube below its vertical center. A first furnace means is located centrally of the tube and is arranged to heat the tube to a drawing temperature. A second furnace means is located between the first furnace means and the upper support means for heating a portion of the tube to a temperature at which the tube becomes slightly plastic but substantially below the drawing temperature. In operation, the tube is first supported by means of the support means and the weighting means and then is heated to a temperature at which it becomes slightly plastic without any significant drawing occurring due to the presence of the weight. The tube is rotated during heating to such plastic temperature and immediately causes the portion below the heating means to assume a vertical orientation, i.e., the weighting means acts as a plumb bob to align the tube with a truly vertical centerline. After the initial straightening operation, the center of the tube while so supported is heated to a softening temperature whereupon the weighting means serves to draw the tube into a capillary portion. Upon removal of the tube from the support means, the capillary portion is severed at the appropriate nozzle length.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a view partly in elevation and partly in cross-section which illustrates rather schematically the manner in which the tube is received in the support means prior to drawing;

FIG. 2 is a cross-sectional view taken substantially along the line II—II of FIG. 1;

FIG. 3 is a view similar to FIG. 1 but illustrating the tube after drawing has been completed;

FIG. 4 is a rather schematic representation of a tube after drawing, illustrating the straightening effect achieved; and FIG. 5 is a fragmentary cross-sectional view on an enlarged scale of a nozzle produced according to the present invention.

DESCRIPTION OF THE PREFERRED EMBODIMENTS

In FIG. 1, reference numeral 10 indicates generally a tube composed of a thermoplastic material such as glass or the like. The bottom of the tube 10 in the preliminary stages of support rests on a slide 11. The tube 10 is received between an upper support means generally indicated at reference numeral 12 and a lower support means generally indicated at reference numeral 13. The upper support means 12 includes a split collet 14 having segmental portions 14a, 14b and 14c as shown in FIG. 2. The collet portions 14a through 14c are urged into tube-engaging relationship by means of a collar 15 which has a frusto-conical portion 15a arranged to engage the collet segments 14a through 14c and clamp the same about the tube 10. The collar 15 is moved into and out of tube-engaging relationship by means of a clutch having a ring portion 16 received within a peripheral notch in the collar 15. The clutch 16 is actuated by means of a rod 17 which is actuated by means of a hydraulic cylinder 18 or the like. In the position shown in FIG. 1, the collar 15 does not engage the collet sections 14a through 14c so that no gripping force is provided by the collet. When the cylinder 18 is actuated, however, the ring 16 urges the collet sections together to exert a gripping force on the tube 10. The ring 16 may have a bearing surface thereon which engages the base of the groove formed in the collar 15 to permit relative rotation therebetween. Such rotation is provided for by means of a pulley 19 formed integrally with the collet 14 and receiving a drive belt 20 as shown in FIG. 1.

The lower support means 13 includes another split collet 21 surrounded by a weighting ring 22. The collet 21 has a flange portion 23, and a coil spring 24 acts between the flange portion and the heavy ring 22 to normally urge the ring 22 into collet closing relation and therefore tube-engaging relation with the tube 10. The collet 21 may be disengaged from the tube 10 either manually or by providing a suitable mechanism (not shown) which compresses the spring 24 and releases the collet from gripping relationship with the tube.

Centrally of the tube as supported in FIGS. 1 and 3 there is provided a furnace 25 which includes a heating element 26 which may be of the resistance heating type. The furnace 25 is arranged to heat the central portion of the tube 10 to a drawing temperature as will be explained in a succeeding portion of the specification.

Located between the furnace 25 and the upper support means 12 is a heater 27 including a heating element 28 and a thermocouple 29. The function of the heater 27 is to heat the portion of the tube between the upper support 12 and the furnace 25 to a temperature at which the tube 10 becomes plastic without, however, causing any significant drawing to occur by virtue of the weighted collet which constitutes the lower support means 13.

The drawing operation is shown more specifically in FIG. 3 of the drawings. The cylinder 18 is first actuated so that the clutch forces the collar 15 into collet closing relationship on the collar 14. The tube 10 is thereby securely held between the upper support member 12 and the lower support member 13. The slide 11 is then removed and the heater 27 is turned on so that the portion of the tube 10 which it embraces is rapidly heated to a plastic temperature substantially below the temperature at which the glass becomes molten. During this interval, the tube 10 is rotated by means of the pulley 19 as indicated by the arrows. As the tube 10 reaches the plastic temperature, any slight deviation from the vertical is corrected, with the weighted collet on the bottom thereof acting as a plumb bob to insure a truly vertical centerline.

The furnace 25 is then energized for a predetermined period of time so that the central portion of the tube 10 is rapidly heated to a drawing temperature at which the tube 10 is necked down to provide a capillary portion 10a as best shown in FIGS. 3 and 4. The heating interval of the furnace 25 is adjusted so that the capillary portion 10a extends for a predetermined length. The proper relationship between the heating interval of the furnace 25, its temperature, and the weight provided by the lower support means 13 can be easily determined by preliminary experiments. At the conclusion of the drawing operation, the lower support member 13 is released, and the cylinder 18 is actuated to disengage the clutch 16 from the ring 15, thereby releasing the collet 14 from its engagement. The tube can then be severed at the appropriate part of the capillary portion 10a to provide a nozzle of desired length.

The manner of providing the true centerline is diagrammatically illustrated in FIG. 4, with the deviation from vertical being substantially exaggerated for purposes of clarity. It will be seen that the weight provided by the weighted collet support assembly 13 acts on the tube 10 which may originally have a bent portion 10b to provide a true vertical centerline extending downwardly from the portion 10c of the tube which is located within the heater 27. At the completion of the drawing operation, the portion above the tube portion 10c may be severed from the tube.

The drawing of FIG. 5 illustrates a nozzle assembly produced according to the present invention consisting of a body portion 31, a uniformly tapered neck portion 32 and a capillary nozzle portion 33 all of which are symmetrical about the centerline of the nozzle. Such nozzle assemblies are extremely suitable for use in the electrochemical machining operations where it is essential to provide a nozzle which has a long, small diameter capillary portion adapted to enter the workpiece to a greater depth without enlarging the hole being drilled. The method and the apparatus of the present invention also provide relatively small taper in the nozzle so that the nozzle may deliver the maximum amount of electrolyte to a maximum depth in the workpiece without enlarging the hole beyond desired dimensions.

It should be evident that various modifications can be made to the described embodiments without departing from the scope of the present invention.

I claim as my invention:

1. An apparatus for forming uniform diameter nozzles on glass tubes which comprises support means for releasably supporting a tube above its vertical center, weighting means below said support means and substantially coaxial therewith for releasably applying a dead weight to said tube below its vertical center, first furnace means located centrally of said tube between said support means and said weighting means and arranged to heat said tube to a drawing temperature and second furnace means located between said first furnace means and said support means for heating a portion of said tube to a temperature at which said tube becomes slightly plastic but substantially below said drawing temperature.

2. The apparatus of claim 1 in which said weighting means includes a split collet releasably engageable with said tube in clamping engagement.

3. The apparatus of claim 1 in which said second furnace means includes an electrical resistance element.

4. In an apparatus for drawing glass tubing wherein a first furnace is located centrally of the tubing to heat a portion of the tubing to a drawing temperature at which it can be drawn, and a weighting means is applied to said tubing to provide the force necessary to draw said tubing while at said drawing temperature, the improvement which comprises a second furnace located above said first furnace arranged to heat a portion of said tubing to a temperature at which it is softened slightly, but below the drawing temperature to thereby straighten said tube before it is drawn.

5. The apparatus of claim 4 which also includes means for rotating said tubing during drawing.

6. The apparatus of claim 4 in which said second furnace includes a resistance heating element.

* * * * *